United States Patent [19]

Ban

[11] Patent Number: 5,362,012
[45] Date of Patent: Nov. 8, 1994

[54] SPINNING REEL HAVING AN IMPROVED PINION GEAR SUPPORT STRUCTURE

[75] Inventor: Masuo Ban, Sakai, Japan
[73] Assignee: Shimano Inc., Osaka, Japan
[21] Appl. No.: 914,733
[22] Filed: Jul. 20, 1992
[30] Foreign Application Priority Data Aug. 1, 1991 [JP] Japan .............................. 3-060598[U]

[51] Int. Cl.⁵ .............................................. A01K 89/01
[52] U.S. Cl. ...................................... 242/321; 242/246
[58] Field of Search ....................... 242/241, 321, 246
[56] References Cited

U.S. PATENT DOCUMENTS 4,456,194  6/1984  Noda .
4,773,611  9/1988  Kaneko ................................ 242/241
4,865,262  9/1989  Tsunoda ............................... 242/241

FOREIGN PATENT DOCUMENTS 859107  1/1961  United Kingdom .
859108  1/1961  United Kingdom .

*Primary Examiner*—Daniel P. Stodola
*Assistant Examiner*—Eileen A. Dunn
*Attorney, Agent, or Firm*—Dickstein, Shapiro & Morin

[57] ABSTRACT

A spinning reel has a handle, a drive gear interlocked to the handle and rotatable about an axis extending transversely of a reel body, and a transmission system for transmitting drive from the drive gear to a rotor through a pinion gear rotatable about an axis extending longitudinally of the reel body. An intermediate member is detachably mounted in the reel body for supporting the pinion gear in a plurality of positions spaced apart axially of the pinion gear.

6 Claims, 3 Drawing Sheets

SPINNING REEL HAVING AN IMPROVED PINION GEAR SUPPORT STRUCTURE

BACKGROUND OF THE INVENTION

This invention relates to spinning reels, and more particularly to an improvement in a structure for supporting a pinion gear of a spinning reel. This spinning reel has a transmission system for transmitting drive from a drive gear rotatable about an axis extending transversely of a reel body, through the pinion gear rotatable about an axis extending longitudinally of the reel body, to a rotor disposed in a front position of the reel body.

DESCRIPTION OF THE RELATED ART

In a spinning reel having the above construction, the pinion gear usually is formed tubular, with a spool shaft extending through the pinion gear. Conventionally, the pinion gear is supported at an intermediate position thereof by the reel body through a ball bearing or the like. The pinion gear is further supported at a rear end thereof by the reel body through a bush or the like.

Desirably, the pinion gear is meshed with the drive gear with high precision since otherwise a handle cannot be turned smoothly.

Conventional reel bodies are often formed by molding plastics such as in injection molding. Such reel bodies may become deformed as a result of cooling of the plastics at times of manufacture. With the deformation of the reel body, the supporting positions of the pinion gear may be displayed to lower the precision of meshing between the pinion gear and drive gear.

Such deformation may occur also as a result of heating at a time of painting the reel body.

It is conceivable to adjust positions of the elements supporting the pinion gear after molding or painting of the reel body. However, it is difficult to secure a high degree of axial precision in each of the two supporting positions of the pinion gear noted above. Thus, there is room for improvement.

SUMMARY OF THE INVENTION

The object of the present invention is to provide an improved spinning reel capable of maintaining a desired axial precision of the pinion gear against deformation of the reel body occurring at a time of manufacture, to assure a smooth line winding operation.

The above object is fulfilled, according to the present invention, by a spinning reel having a transmission system for transmitting drive from a drive gear to a rotor through a pinion gear as noted in the outset hereof, wherein an intermediate member is detachably mounted in the reel body for supporting the pinion gear in a plurality of positions spaced apart axially of the pinion gear.

This construction has the following functions and effects.

The above features may be arranged as shown in FIG. 1, for example. For adjusting axial position of pinion gear 8 after manufacture of a reel body 2, position of an intermediate member 14 may be adjusted relative to the reel body 2. Consequently, a plurality of supporting positions spaced apart axially of the pinion gear 8 are adjusted at the same time, thereby to maintain the support positions coaxial with each other.

According to the present invention, the pinion gear 8 is not supported directly by the reel body 2, but is supported by the reel body 2 through the intermediate member 14 having pinion gear supporting portions. Thus, axial adjustment of the pinion gear 8 requires only adjustment of the intermediate member 14 relative to the reel body 2.

The present invention, therefore, provides an improved spinning reel capable of maintaining a desired axial precision of the pinion gear against deformation of the reel body occurring at a time of manufacture, to assure a smooth line winding operation.

The present invention has a further advantage that, even when the pinion gear is axially displaced after a long period of use, a proper condition is restored by a relatively simple adjustment such as adjustment of a shim mounted in a flanged portion of the intermediate member.

Other features and advantages of the invention will be apparent from the following description of the embodiment of the invention taken with reference to the accompanying drawings.

DETAILED DESCRIPTION OF THE PREFERRED EMBODIMENT

A spinning reel according to the present invention will be described in detail with reference to the drawings.

Figure 5:
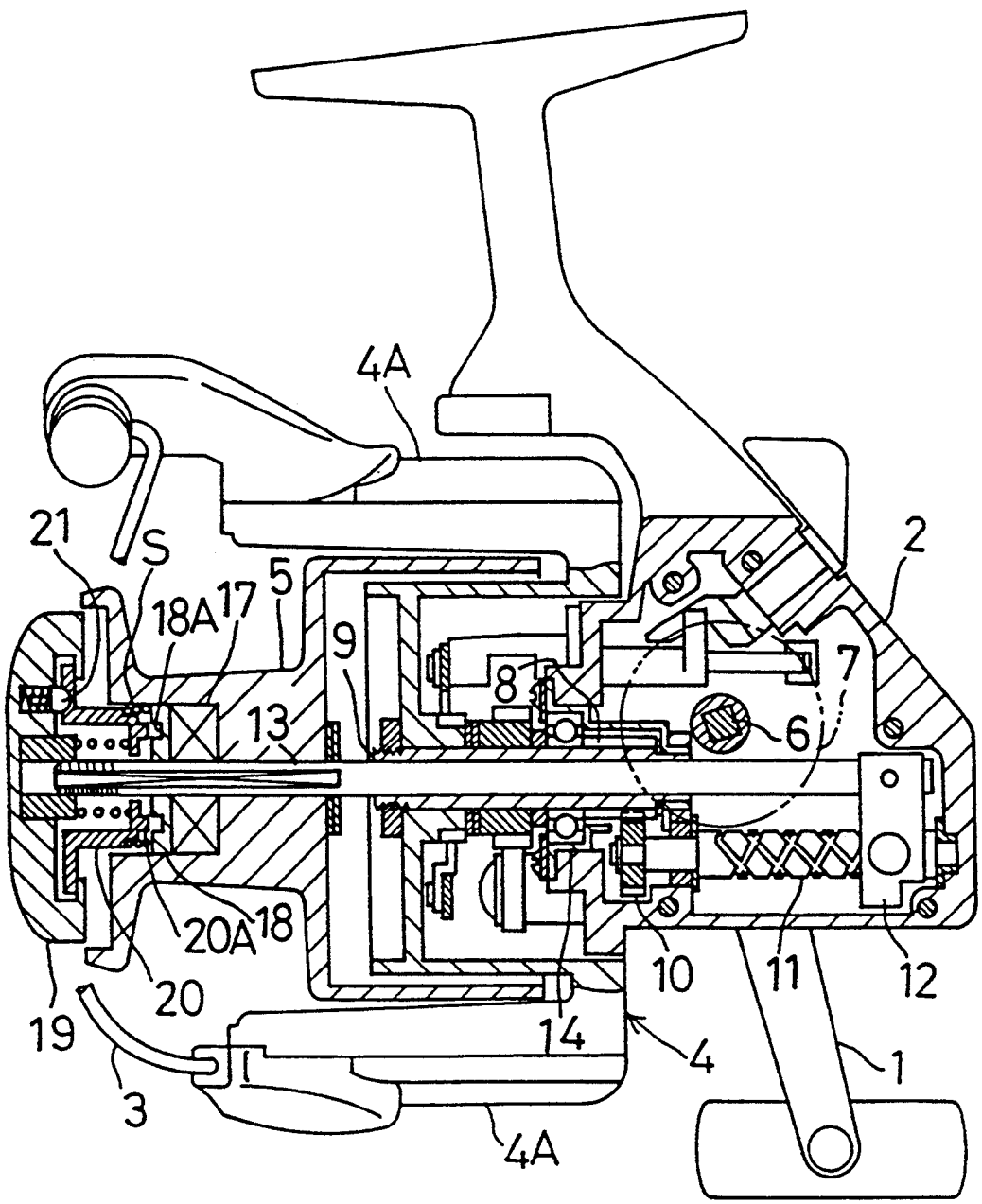
FIG. 5 is a side view in vertical section of a spinning reel.

As shown in FIG. 5, this spinning reel includes a handle 1 attached to a reel body 2, a rotor 4 carrying a bail 3 and mounted on a forward portion of the reel body 2, and a spool 5 connected to the forward portion of the reel body 2 for winding a fishing line (not shown). The spinning reel further includes a drive system for transmitting drive from a handle shaft 6 connected to the handle 1, to the rotor 4 through a drive gear 7, a pinion gear 8 and a sleeve shaft 9, and an oscillating mechanism having an input gear 10, a screw shaft 11 and a slider 12 for converting drive from the pinion gear 8 into a reciprocal motion for transmission to a spool shaft 13.

The pinion gear 8 is formed integral with the sleeve shaft 9, and is supported by the reel body 2 through an intermediate member 14.

Figure 1:
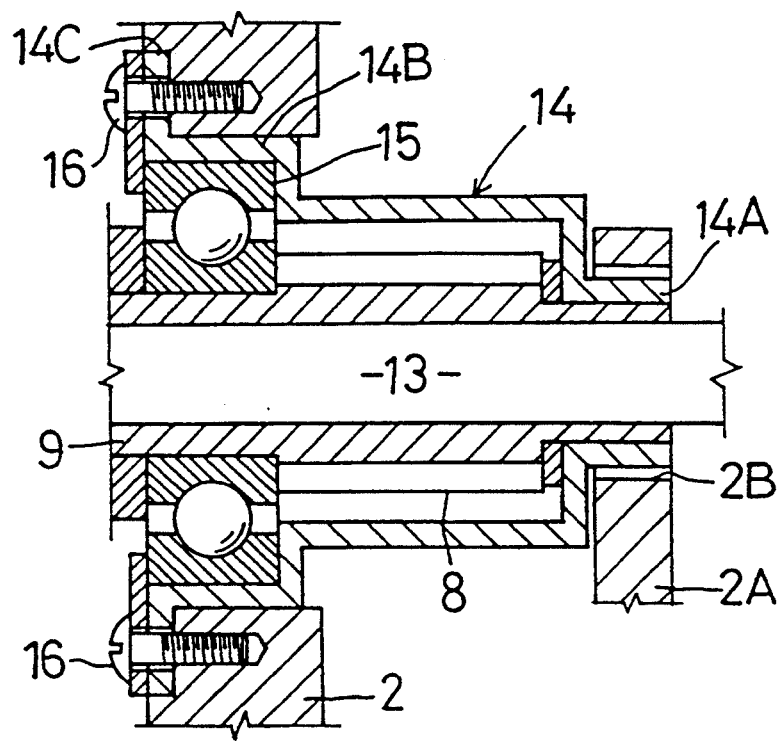
FIG. 1 is a sectional view of an intermediate member.
Figure 2:
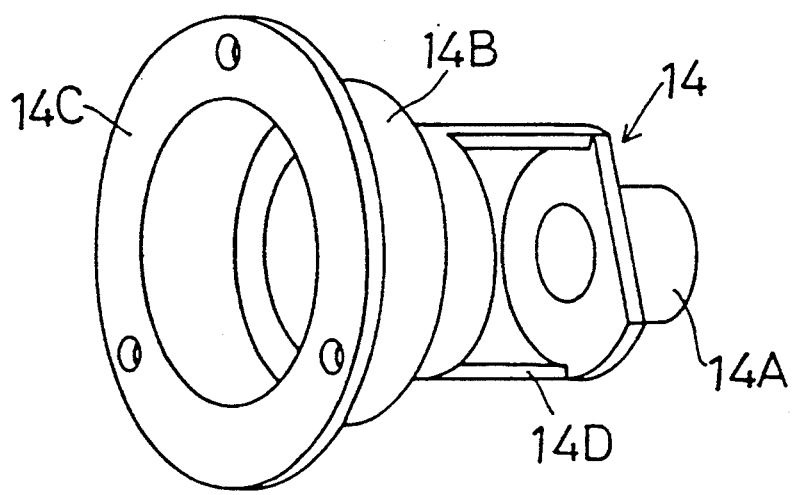
FIG. 2 is a perspective view of the intermediate member.

As shown in FIGS. 1 and 2, the intermediate member 14 has a rear support portion 14A for rotatably supporting a rear end of the pinion gear 8, and a front support portion 14B for supporting a forward end of the pinion gear 8 through a bearing 15. The intermediate member 14 is formed of a metallic material such as an aluminum alloy, and defines a flange 14C secured to a forward surface of the reel body 2 through screws 16. The drive gear 7 and the input gear 10 of the oscillating mechanism are meshed with the pinion gear 8 through openings 14D of the intermediate member 14. The intermediate member 14 may be formed of various other materials than a metallic material such as an aluminum alloy.

With this reel, even if the reel body 2 becomes deformed at the time of manufacture, the intermediate member 14 is adjustable relative to the reel body 2. Consequently, the pinion gear 8 is positioned with a desired axial precision to be meshed with the drive gear 7 smoothly.

The intermediate member 14 has a rear end slightly spaced from an opening 2B defined in a frame 2A mounted inside the reel body 2. When a strong external force is applied, the intermediate member 14 contacts an inner wall of the opening 2B, so that the posture of the intermediate member 14 will not vary to a great extent.

As shown in FIG. 5, the spool includes a drag mechanism having a drag knob 19 and a pressure plate 20 connected thereto for adjusting pressing forces of friction plates 17 and a washer 18 mounted inside the spool 5. Pins 20A and recesses 18A are arranged engageable with each other between the washer 18 mounted on the spool shaft 13 not to be rotatable relative thereto, and the pressure plate 20 rotatable relative to the drag knob 19. When the drag mechanism is loosened to a predetermined degree, the pins 20A and recesses 18A are disengaged under the biasing force of a return spring S. As a result, the pressure plate 20 is not rotated, and a clicking mechanism 21 provided for producing intermittent sounds with rotation of the pressure plate 20 does not operate. Thus, the angler can ascertain a state of the drag mechanism from a state of the clicking mechanism 21.

Figure 3:
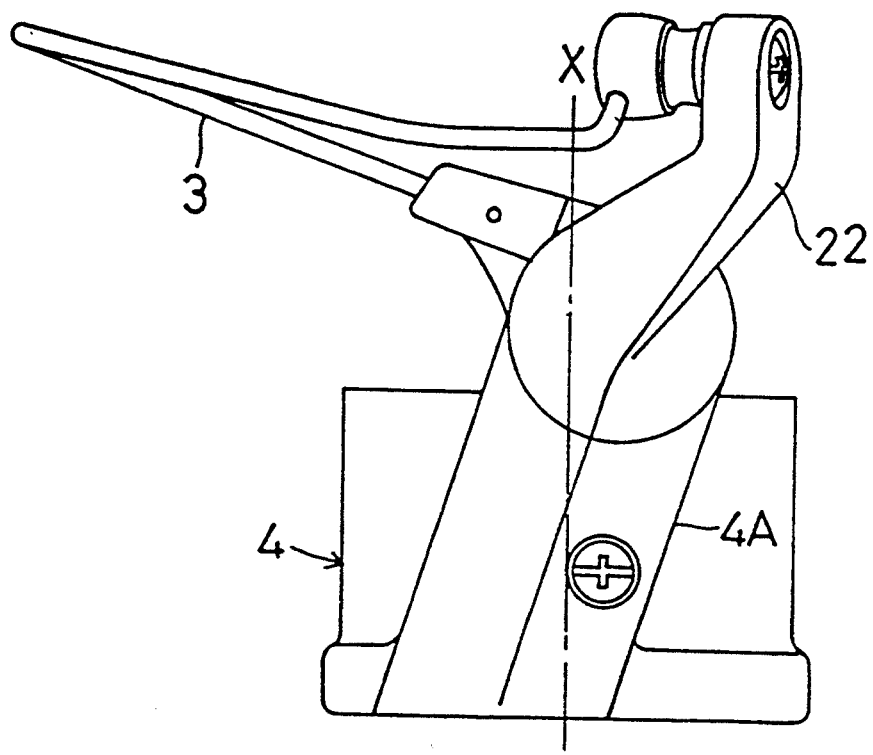
FIG. 3 is a side view of a rotor.
Figure 4:
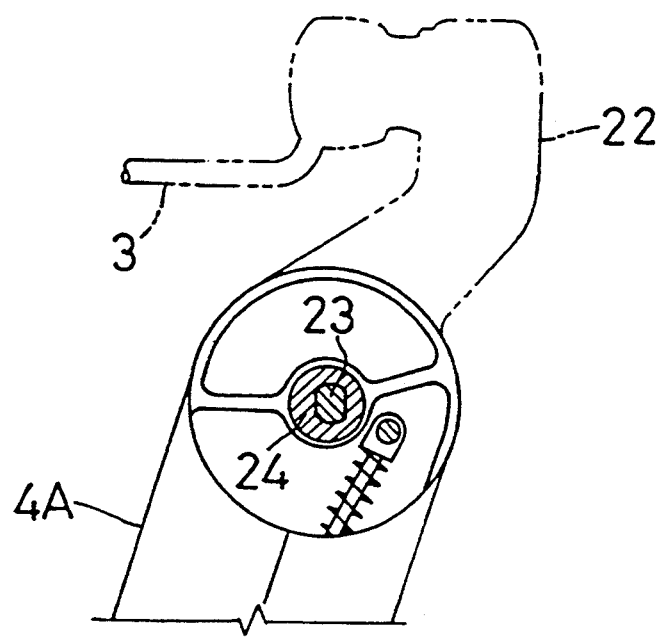
FIG. 4 is a sectional view of an arm cam support structure.

The rotor 4 has a pair of arms 4A set to a position offset from an axis of rotation X as shown in FIG. 3, to provide a good weight balance of the rotor 4. When the rotor 4 is rotated to wind the fishing line, a good dynamic balance is assured to enable a smooth operation. As shown in FIG. 4, an arm cam 22 has a pivotal axis 23 supported in one of the arms 4A through an eccentric bush 24. The eccentric bush 24 may have a varied posture to vary position of the pivotal axis 23.

The foregoing embodiment may be modified such that the intermediate member supports the pinion gear at three or more positions. The intermediate member may be fixedly connected to an inner surface of the reel body.

What is claimed is:
1. A spinning reel comprising:
 a reel body;
 a handle;
 a spool supported by said reel body;
 a rotor rotatably supported by said reel body and adapted to wind a fishing line onto said spool in response to rotation of said handle;
 a sleeve shaft integrally rotatable with said rotor;
 transmission means for transmitting rotation of said handle to said rotor, said transmission means including:
 a drive gear connected to said handle;
 a pinion gear engaged with said drive gear to transmit rotation of said drive gear to said rotor, said pinion gear being coupled to said sleeve shaft;
 an intermediate member detachably coupled to said reel body to rotatably support said pinion gear, said intermediate member including:
  (a) a front cylindrical portion having a front interior surface and a front exterior surface, said front cylindrical portion rotatably supporting said pinion gear at a frontward portion of said pinion gear through said front interior surface, said front cylindrical portion being supported by said reel body through said front exterior surface;
  (b) a rear cylindrical portion having a rear interior surface and a rear exterior surface, said rear cylindrical portion rotatably supporting said pinion gear at a rearward portion of said pinion gear through said rear interior surface, said rear cylindrical portion being positioned such that said reel body limits radial displacement of said rear cylindrical portion through said rear exterior surface;
  (c) a connecting member to connect said front cylindrical portion with said rear cylindrical portion, said connecting member defining an opening to receive said drive gear.

2. A spinning reel as in claim 1, wherein said intermediate member includes a flange portion extending radially outwardly from a frontward portion of said front cylindrical portion, and said intermediate member is coupled to said reel body through said flange portion.

3. A spinning reel as in claim 1, wherein said pinion gear is integrally formed on said sleeve shaft.

4. A spinning reel as in claim 1, wherein said front cylindrical portion supports said pinion gear through a bearing.

5. A spinning reel as in claim 1, wherein said rear exterior surface of said rear cylindrical portion is positioned within said reel body so as to have a substantially uniform distance between said rear exterior surface and said reel body in all radial directions.

6. A spinning reel as in claim 1, wherein said intermediate member has a substantially stepped configuration with decreasing diameters from said front cylindrical portion to said rear cylindrical portion to facilitate attachment of said intermediate member to said reel body in an axial direction of said intermediate member.

* * * * *